March 24, 1953     W. B. WEIS     2,632,602
ELECTRIC COIL WINDING
Filed March 11, 1950
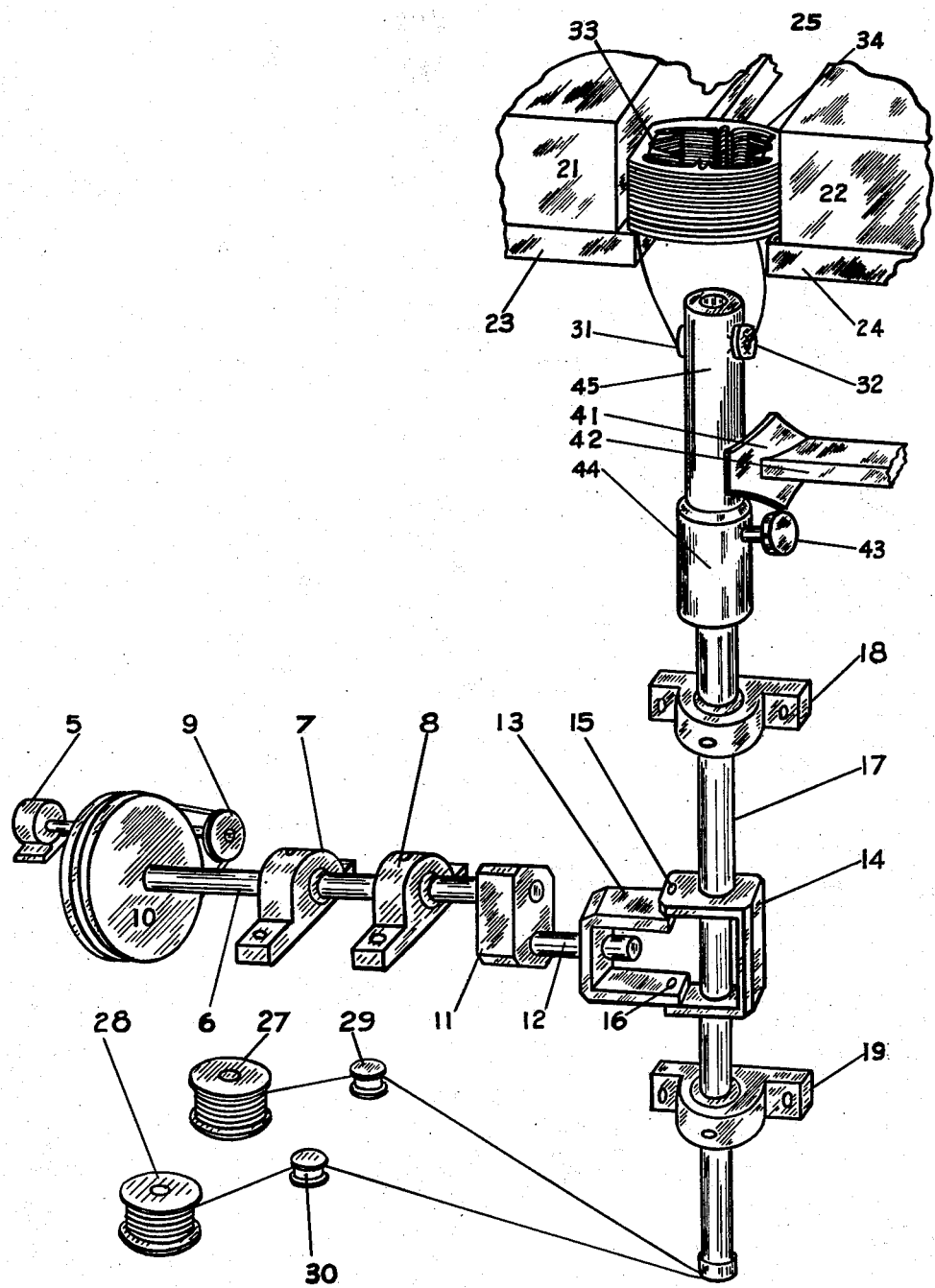
INVENTOR
WILLIAM B. WEIS
BY
Martin J. Finnegan
ATTORNEY

Patented Mar. 24, 1953

2,632,602

UNITED STATES PATENT OFFICE 2,632,602

ELECTRICAL COIL WINDING

William B. Weis, Detroit, Mich., assignor to Redmond Company, Inc., Owosso, Mich., a corporation of Michigan Application March 11, 1950, Serial No. 149,039

2 Claims. (Cl. 242—1)

This invention relates to the winding of electrical coils, and particularly to the winding of the field coils of a dynamo-electric machine.

An object of the invention is to provide a novel method of winding the required number of turns of wire on one or more pairs of diametrically opposed field poles simultaneously; the wire being applied directly to the field poles rather than to a separate winding form.

A second object of the invention is to provide a novel machine facilitating the simultaneous winding of a pair of diametrically opposed field elements; the machine being so constructed as to provide a relatively wide wire applying stroke making possible the spanning of a field element having an arcuate dimension on the order of 60° to 90° and constituting an integral part of a complete field structure having any desired diameter within the range of 3 to 9 inches (this range being sufficient to embrace substantially all motors and generators of standard commercial manufacture).

A third object of the invention is to provide a novel method of simultaneously feeding wire to diametrically opposite field poles of a field structure, which novel method includes the step of imparting to the feeding means a combined oscillatory and reciprocatory motion of relatively large amplitude to produce the necessary relatively wide spanning effect above referred to.

A fourth object of this invention is the provision of a novel combination of mechanical movements for converting the rotation of an actuating shaft into a combined oscillatory and reciprocatory motion of a wire feeding shaft to impart to the latter a range of oscillation and reciprocation of the required relatively wide amplitude necessary to effect the spanning of the relatively wide field poles above described.

A fifth object of the invention is to provide, in combination with the novel oscillation and reciprocation producing means above referred to, a supplementary oscillation augmenting means serving automatically to extend the sweep of the oscillating motion as the latter approaches each extreme position, as determined by the action of the motion converting mechanism; this supplementary means for further extending the oscillatory range serving to correspondingly extend the range of applicability of the disclosed winding apparatus.

These and other objects of the invention will be better understood upon reference to the accompanying drawing illustrating the application of the invention to a two-pole field structure of a dynamo-electric machine. It is to be understood of course that the principles herein disclosed are capable of embodiment in machines differing in the number and relative disposition of component elements, and applicable to the winding of field elements differing in size and relative disposition from those illustrated, but within the limits heretofore designated.

The single figure of the drawing is a schematic view of the device of the invention.

Referring to the single figure of the drawing, the reference number 5 designates an electric motor representing any suitable source of power for rotation of an actuating shaft 6 mounted in suitable bearings 7 and 8 and adapted to operate continuously in a single direction of rotation at a speed proportionate to that of motor 5 but considerably reduced by reason of the interposed reduction gears or pulleys as indicated at 9 and 10. The opposite end of the shaft 6 carries a crank element 11 which is keyed or otherwise secured to the shaft 6 to be positively rotated therewith; and extending from the outer portion of the crank is a crank pin 12 adapted to fit within the central portion of a U shaped element 13 constituting one of a pair of articulated crank elements 13, 14, the points of articulation being indicated at 15 and 16, and the crank element 14 being integrated with a vertically disposed hollow shaft 17 mounted in bearings 18 and 19, in which bearings the shaft oscillates and moves longitudinally of its own axis in opposite directions alternately and to an extent determined by the throw of the cranks 11 and 13; the throw of the crank 11 determining the extent of longitudinal motion of the shaft and the throw of the cranks 11 and 14 combined determining the extent of angular swing or oscillation.

The field structure to receive windings is placed between a pair of supporting elements 21 and 22 provided with extending ledges 23 and 24 disposed directly above the upper end of the shaft 17 and spaced apart a sufficient distance (which may be adjustable) to permit reception of the field structure 25 in position to rest upon the ledges 23 and 24 while the winding operation is being performed. Wire is supplied to the hollow shaft 17 from a pair of spools 27 and 28, the wire being passed around suitable guiding rollers 29 and 30 which direct the wire into the lower open end of the shaft 17 and upwardly to the radially disposed wire outlets or needles 31 and 32, from which needles the two wires extend to the diametrically opposed wire receiving polar projections 33 and 34, respectively, of the field structure 25; the wire being wound upon said polar projections 33 and 34 simultaneously as the shaft 17 moves in opposite longitudinal transverse directions alternately to describe a circular, looping path having the proper scope to encompass the dimensions of the polar projections.

As the polar projections may have a width that is somewhat greater than the oscillatory range imparted to the shaft 17 by the combined cranks 11, 13 and 14, the invention provides supplementary means for increasing the amplitude of oscillation of the needles 31 and 32 so that they may effect a throw of the successive loops of wire the necessary distance to insure embracing the polar projections. As illustrated, this supplementary means comprises a cam element 41 mounted on the end of a supporting bracket 42 and in the path of upward motion of a cam follower 43 extending radially from a sleeve 44 surrounding the shaft 17 and movable with such shaft as the latter moves longitudinally, but being capable of limited rotation independently of shaft in response to camming engagement of the cam 41 with the cam follower 43; the sleeve 44 having an extension 45 carrying the needles 31 and 32, so that said extension 45 will respond with sleeve 44 upon the occurrence of the camming action just referred to. By reason of this camming action, the oscillatory range of the needles 31 and 32 is increased somewhat beyond the oscillatory range of the shaft 17 and the capacity of the winding mechanism is thus increased to make possible the winding of coils upon polar projections whose width exceeds the eccentricity of the combined cranks 11, 13 and 14. Even in those installations wherein the eccentricity of the cranks is sufficient to produce the necessary throw of the successive wire loops, the provision of the supplementary camming mechanism 41, 43 is nevertheless useful as a means of providing positive assurance that each successive oscillatory stroke of the needles 31 and 32 will be positively and accurately equalized with respect to the winding operation being performed.

What I claim is:

1. In a coil winding machine, a vertically disposed hollow shaft having a hollow upper extension aligned therewith but adapted for limited rotation independently thereof, said shaft extension having a radially extending needle element, a fixture adapted to support a complete field structure in a position directly above said shaft, said field structure having a polar projection of relatively wide extent, a spool-wound wire passing upwardly through said shaft and shaft extension, and out through said radially disposed needle element, and means for imparting a combined longitudinal and transverse motion to said shaft, to cause said wire to be looped directly around said polar projection in response to said shaft motion, said motion imparting means including a driving shaft rotatable about an axis running transversely of the axis of said vertically disposed shaft, and interarticulated U-shaped yoke elements operatively connected with said two shafts, to produce said combined longitudinal and transverse motion.

2. A machine as defined in claim 1, including supplementary means comprising a radial projection on said shaft extension and a cam-surfaced element in a fixed location, in the path of movement of said radial projection for imparting a further increment of motion to said vertical shaft extension as the latter approaches the extreme position in each direction of motion.

WILLIAM B. WEIS.

REFERENCES CITED

The following references are of record in the file of this patent:

UNITED STATES PATENTS

| Number | Name | Date |
|---|---|---|
| 1,431,947 | Gysel | Oct. 17, 1922 |